(12) United States Patent
Kashima et al.

(10) Patent No.: US 10,225,130 B2
(45) Date of Patent: Mar. 5, 2019

(54) METHOD AND APPARATUS FOR CLASSIFING IP FLOWS FOR EFFICIENT QUALITY OF SERVICE REALIZATION

(75) Inventors: Tsuyoshi Kashima, Yokohama (JP); Vinh Phan-Van, Oulu (FI); TvIn Sivakumar, Tokyo (JP)

(73) Assignee: Nokia Technologies Oy, Espoo (FI)

( * ) Notice: Subject to any disclaimer, the term of this patent is extended or adjusted under 35 U.S.C. 154(b) by 1014 days.

(21) Appl. No.: 11/327,407

(22) Filed: Jan. 9, 2006

(65) Prior Publication Data

US 2007/0081455 A1    Apr. 12, 2007

Related U.S. Application Data

(60) Provisional application No. 60/724,281, filed on Oct. 7, 2005.

(51) Int. Cl.
*H04L 29/06* (2006.01)
*H04L 12/801* (2013.01)
(Continued)

(52) U.S. Cl.
CPC .............. *H04L 29/06* (2013.01); *H04L 47/10* (2013.01); *H04L 47/14* (2013.01);
(Continued)

(58) Field of Classification Search
CPC ..... H04L 47/10; H04L 47/14; H04L 47/2408; H04L 47/2441; H04L 69/16; H04L 69/161; H04L 69/32; H04L 29/06
(Continued)

(56) References Cited

U.S. PATENT DOCUMENTS 6,351,465 B1 * 2/2002 Han ........................ 370/395.43
6,452,915 B1 * 9/2002 Jorgensen ................. H04L 1/20
370/328
(Continued)

FOREIGN PATENT DOCUMENTS

EP          1432262 A1    6/2004
WO      WO 02/098077    12/2002
WO      WO 2006/016213    2/2006

OTHER PUBLICATIONS

International Search Report for International Application No. PCT/IB2006/002517, filed Sep. 13, 2007.
(Continued)

*Primary Examiner* — Raj Jain
*Assistant Examiner* — Andrew C Lee
(74) *Attorney, Agent, or Firm* — Mintz Levin Cohn Ferris Glovsky and Popeo, P.C.

(57) ABSTRACT

A network component for classifying at least one IP flow for efficient quality of service realization in a network, where in one embodiment the network component includes a unit for detecting at least one IP flow from at least one IP packet. Upon detection of the at least one IP flow, the unit obtains predefined information from the at least one IP packet to determine a quality of service requirement that is associated with the at least one IP packet. The unit creates at least one other IP flow by multiplexing a plurality of IP packets with the same quality of service requirement into the other IP flow or demultiplexing the plurality of IP packets with different quality of service requirements into other IP flows, each of the other IP flows having a different quality of service requirement.

16 Claims, 3 Drawing Sheets

(51) Int. Cl.
*H04L 12/851* (2013.01)
*H04L 29/08* (2006.01)

(52) U.S. Cl.
CPC ...... *H04L 47/2408* (2013.01); *H04L 47/2441* (2013.01); *H04L 69/161* (2013.01); *H04L 69/16* (2013.01); *H04L 69/32* (2013.01)

(58) Field of Classification Search
USPC ....... 370/229, 230, 230.1, 235, 236, 395.42, 370/401
See application file for complete search history.

(56) References Cited

U.S. PATENT DOCUMENTS

| | | | | |
|---|---|---|---|---|
| 6,594,246 | B1* | 7/2003 | Jorgensen | H04L 1/20 370/338 |
| 6,847,610 | B1* | 1/2005 | Suumaki | H04L 47/762 370/230.1 |
| 6,865,185 | B1* | 3/2005 | Patel | H04L 47/12 370/310 |
| 7,185,073 | B1* | 2/2007 | Gai | H04L 41/0893 709/221 |
| 9,867,079 | B2* | 1/2018 | Eriksson | H04W 28/0268 |
| 2001/0007560 | A1* | 7/2001 | Masuda | H04Q 11/0478 370/401 |
| 2002/0023080 | A1* | 2/2002 | Uga | H04L 45/00 |
| 2002/0075805 | A1* | 6/2002 | Gupta et al. | 370/235 |
| 2002/0126675 | A1* | 9/2002 | Yoshimura | H04L 47/10 370/395.21 |
| 2003/0133411 | A1* | 7/2003 | Ise | H04L 47/10 370/230 |
| 2003/0203736 | A1* | 10/2003 | Chi | H04W 28/24 455/450 |
| 2003/0227876 | A1* | 12/2003 | Ruutu | H04L 45/00 370/252 |
| 2004/0100903 | A1* | 5/2004 | Han | H04L 47/10 370/230 |
| 2004/0230444 | A1* | 11/2004 | Holt | G07F 17/32 370/329 |
| 2005/0201353 | A1* | 9/2005 | Lee | H04L 1/0018 370/349 |
| 2008/0025218 | A1* | 1/2008 | Liu | H04L 47/10 370/235 |

OTHER PUBLICATIONS

Panasonic: "LTE—Layer 2 protocol functions", 3GPP Draft, R2-051882, 3GPP TSG RAN2#48, London, UK, Aug. 26, 2005.

Qualcomm: "QoS Architecture Considerations", 3GPP Draft, R2-042128, 3GPp TSG-RAN WG2 meeting #44, Sophia Antipolis, France, Oct. 1, 2004.

Philips, "E-DCH MAC-e multiplexing", R2-042345, 3GPP TSG-RAN WG2 meeting #45, Yokohama, Japan, Nov. 12, 2004.

3GPP TS 25.309, V6.4.0, 3rd Generation Partnership Project; Technical Specification Group Radio Access Network; FDD Enhanced Uplink; Overall description; Stage 2, Release 6, Sep. 2005.

* cited by examiner

METHOD AND APPARATUS FOR CLASSIFYING IP FLOWS FOR EFFICIENT QUALITY OF SERVICE REALIZATION

BACKGROUND OF THE INVENTION

Field of the Invention

The present invention relates to Quality of Service (QoS) realization in an IP network, and more particularly, to a method for realizing QoS in IP flows based on at least one predefined or currently used field.

Description of the Related Art

In current IP networks, applications may specify the level of QoS that is associated with each IP packet flow. Different applicants may require different levels of QoS. For example, a voice application requires low delay while a file transfer application does not. In addition, different packets of one application may also require different levels of QoS. For example, in one video application, packets for a full picture require higher error tolerance than packets for the difference of succeeding pictures. If there are several IP flows, i.e., IP packets that have the same source IP address, destination IP address, Layer 4 protocol number, source port number, destination port number and Differentiated Services Code Point (DSCP) for DiffServ, which require the same level of QoS, it is necessary to classify them into the same Layer 2 (L2) service requirements. For example, the usual web browsers typically establish several TCP connections simultaneously, for data with the same level of QoS, for speeding up the connection. However, these current web browsers do not use these simultaneous connections to separate the packets in L2. It should be noted that the DSCP field associated with each IP packet is a field that is used to specify the DiffServ treatment, and as such, the DSCP field is excepted to include priority/urgency equivalent information.

In prior techniques, it is assumed that each IP FLOW, which is detected, for example, by an entity between a user equipment and a core network in a Universal Mobile Telecommunications System (UMTS), is a single IP flow. Upon detection of each IP flow by the entity, a logical channel is generated for the IP flow and the IP flow is mapped to a corresponding logical channel of a MAC layer. In current IP networks, for each logical channel that is generated, a separate MAC queue is also generated. Thus, all IP flows are treated in different MAC queues, even if the IP flows have the same level of QoS requirements. While in this implementation, IP packets with the same QoS requirements may be treated in the same manner, this implementation is not efficient in terms of MAC queue management. In addition, because this scheme uses a different logical channel flow identifier for each IP flow, a longer logical channel flow identifier is required. The longer logical channel flow identifier is not desirable because the logical channel flow identifier needs to be transmitted over the air.

If logical channels requiring the same level of QoS are multiplexed before the MAC queuing process, the inefficient queue management may be avoided. However, this implementation does not solve the issue of the longer logical channel flow identifier, as outlined above.

In one technique, the MAC can also concatenate packets from different logical channels with the same QoS requirements. In this case, all MAC segments, which are components of MAC packet data unit (PDU), need to have logical channel flow identifier information. This technique makes the PDU structure more complicated and inefficient. In addition, because this scheme uses different logical channel flow identifiers, this implementation also does not solve the issue of the longer logical channel flow identifier, as outlined above.

In currently used techniques, if different applications require different levels of QoS, additional information will need to be passed when each IP packet is padded to the MAC layer. To use layer 1 (L1)/Layer 2 (L2) resources in IP networks efficiently in support of diverse QoS, it is important to classify IP packets into different L2 service requirements.

SUMMARY OF THE INVENTION

A network component for classifying at least one IP flow for efficient quality of service realization in a network, where in one embodiment, the network component includes a unit for detecting at least one IP flow from at least one IP packet. Upon detection of the at least one IP flow, an obtaining unit obtains predefined information from the at least one IP packet to determine a quality of service requirement that is associated with the at least one IP packet. A creating unit creates at least one other IP flow by multiplexing a plurality of IP packets with the same quality of service requirement into the other IP flow or demultiplexing the plurality of IP packets with different quality of service requirements into other IP flows, each of the other IP flows having a different quality of service requirement.

A network component for classifying at least one IP flow for efficient quality of service realization in a network, where in another embodiment, the network component includes detecting means for detecting at least one IP flow from at least one IP packet. Upon detection of the at least one IP flow, predefined information from the at least one IP packet is obtained to determine a quality of service requirement that is associated with the at least one IP packet. The network component also includes creating means for creating at least one other IP flow by multiplexing a plurality of IP packets with the same quality of service requirement into the other IP flow or demultiplexing the plurality of IP packets with different quality of service requirements into other IP flows, each of the other IP flows having a different quality of service requirement.

A method for classifying at least one IP flow for efficient quality of service realization in a network, where the method includes the steps of detecting at least one IP flow from at least one IP packet and upon detection of the at least one IP flow, obtaining predefined information from the at least one IP packet to determine a quality of service requirement that is associated with the at least one IP packet. The method also includes the step of creating at least one other IP flow by multiplexing a plurality of IP packets with the same quality of service requirement into the other IP flow or demultiplexing the plurality of IP packets with different quality of service requirements into other IP flows, each of the other IP flows having a different quality of service requirement.

An apparatus for classifying at least one IP flow for efficient quality of service realization in a network, where in an embodiment the apparatus includes detecting means for detecting at least one IP flow from at least one IP packet and obtaining means, upon detection of the at least one IP flow, for obtaining predefined information from the at least one IP packet to determine a quality of service requirement that is associated with the at least one IP packet. The apparatus also includes creating means for creating at least one other IP flow by multiplexing a plurality of IP packets with the same quality of service requirement into the other IP flow or demultiplexing the plurality of IP packets with different quality of service requirements into other IP flows, each of the other IP flows having a different quality of service requirement.

A computer program, embodied on a computer readable medium, for classifying at least one IP flow for efficient quality of service realization in a network. Upon implementation, the computer program is configured to perform the steps of detecting at least one IP flow from at least one IP packet and upon detection of the at least one IP flow, obtaining predefined information from the at least one IP packet to determine a quality of service requirement that is associated with the at least one IP packet. The computer program is also configured to perform the step of creating at least one other IP flow by multiplexing a plurality of IP packets with the same quality of service requirement into the other IP flow or demultiplexing the plurality of IP packets with different quality of service requirements into other IP flows, each of the other IP flows having a different quality of service requirement.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein.

DETAILED DESCRIPTION OF PREFERRED EMBODIMENTS

Reference will now be made to the preferred embodiments of the present invention, examples of which are illustrated in the accompanying drawings.

Figure 1:
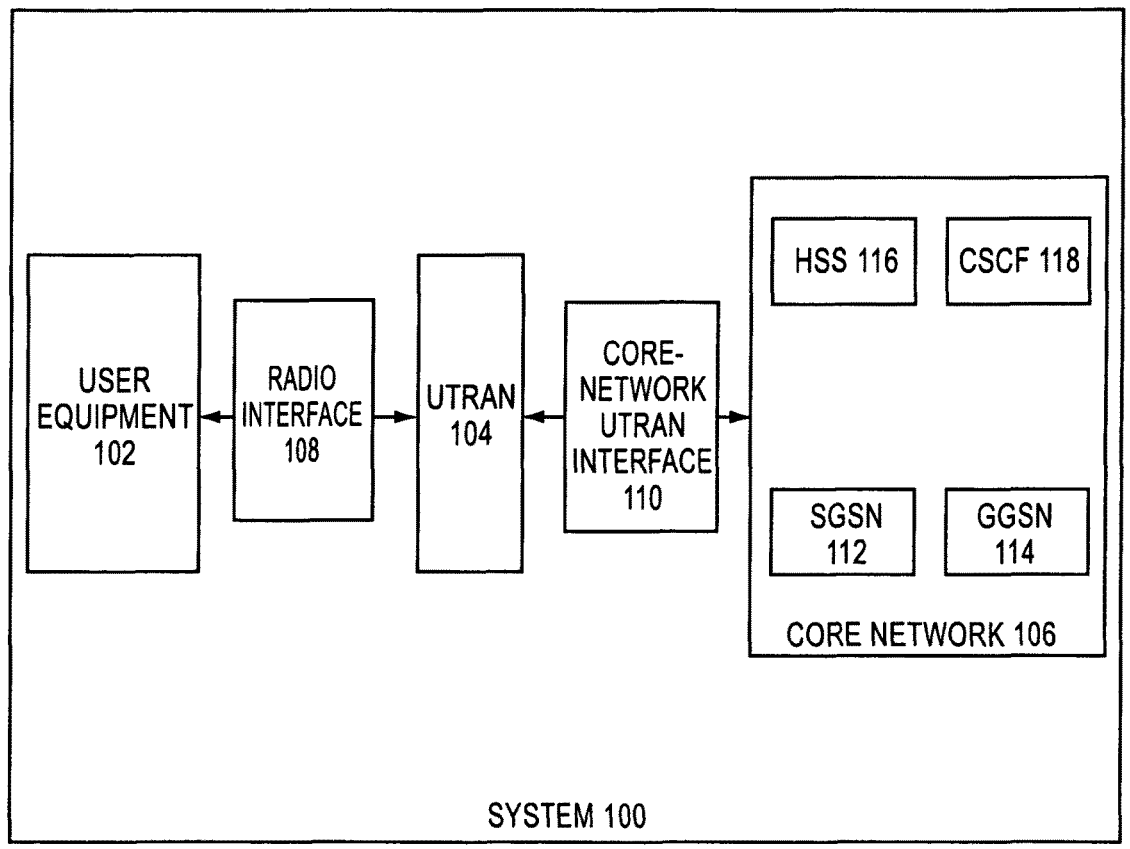
FIG. 1 illustrates a Universal Mobile Telecommunications System (UMTS) system architecture in which an embodiment the present invention may be implemented.

FIG. 1 illustrates a Universal Mobile Telecommunications System (UMTS) system architecture 100 in which an embodiment of the present invention is implemented. System 100 includes a user equipment 102, a UMTS Terrestrial Radio Access Network (UTRA/UTRAN) 104 and a Core Network 106. A radio interface 108 connects user equipment 102 with UTRAN 104 and a core network-UTRAN interface 110 connects UTRAN 104 with core network 106. As is known to those of ordinary skill in the art, user equipment encompasses a variety of equipment types with different levels of functionality. User equipment 102 may include a removable smart cart that may be used in different user equipment types. UTRAN 104 includes entities which provide the user of user equipment 102 with a mechanism to access core network 106. Core network 106 includes entities which provide support for network features and telecommunications services, such as management of the user location, control of network features and services, and switching and transmission mechanisms for signaling and user generated information. In an embodiment, the core network includes a Serving GPRS Support Node (SGSN) 112 for network access support and mobility management, a Gateway GPRS Support Nodes (GGSN) 114 for access to service areas over IP packet data networks, a Home Subscriber Server (HSS) 116 for user identification, security, location, and preferences, and a Call State Control Function (CSCF) 118 which is a SIP server that supports and controls multimedia sessions for IP terminals, routes incoming calls, call state management, user profiling and address handling.

The present invention is implemented in a $3^{rd}$ Generation Partnership Project (3GPP) radio access network and functions to meet the Evolved UMTS Terrestrial Radio Access and Evolved UMTS Terrestrial Radio Access Network (E-UTRA and UTRAN) requirements. To ensure the competitiveness of 3GPP radio access network technology, an E-UTRA and UTRAN framework is being developed for the evolution of 3GPP radio-access technology towards a high-data rate, low latency and packet optimized radio access technology. The E-UTRA and UTRAN air interface is being designed to support both frequency division duplex (FDD) and time division duplex (TDD) modes of operation. The E-UTRA and UTRAN interface is designed, for FDD, to support simultaneous uplink/downlink in different frequency band, and to support non-simultaneous uplink/downlink in the same frequency band, for TDD. The E-UTRA and UTRAN interface is also designed to consider FDD extension to combine FDD/TDD, wherein the E-UTRA and UTRAN interface supports non-simultaneous uplink/downlink in different frequency bands and simplify multi-band terminals.

The key requirements of the E-UTRA and UTRAN design in the downlink direction are good link performance in diverse channel conditions, good system performance, low transmission delay, well-matched to multi-antenna techniques including MIMO, efficient broadcast, and spectrum flexibility, among others. The key uplink related requirements and their implications of the E-UTRA and UTRAN design are good coverage, low delay, low cost terminal and long battery life, unnecessary base station complexity, and possibility for orthogonal intra-cell and inter-cell interference reduction. The E-UTRA and UTRAN thus seeks to improve current UTRAN with notably reduced complexity and increased flexibility. It should be noted that while the system illustrated above shows a network including E-UTRA and UTRAN, the present invention is not limited to a network including E-UTRA and UTRAN. In fact the present invention may be implemented in any evolution of a network including E-UTRA and UTRAN and/or any fixed network.

Figure 2:
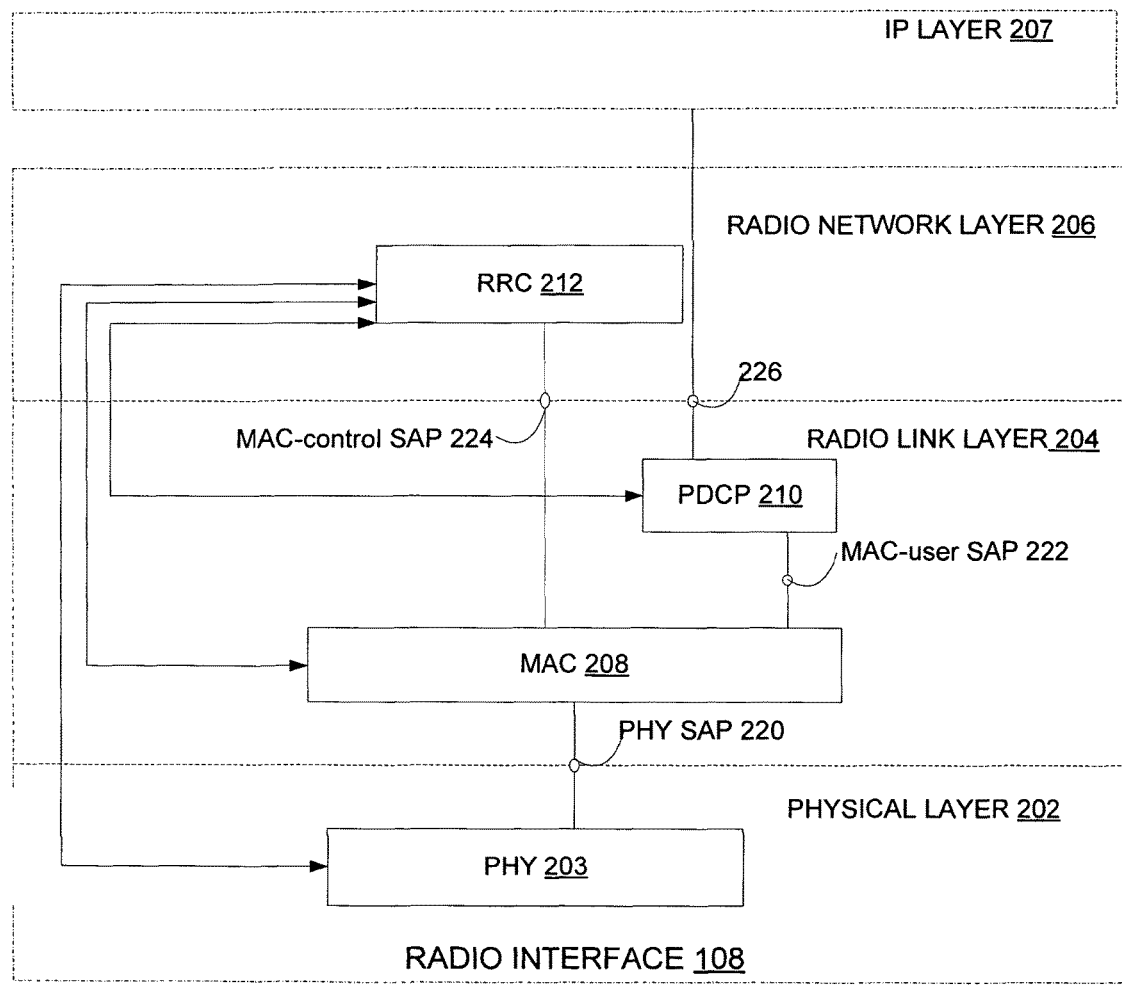
FIG. 2 illustrates the structure of a radio interface in which an embodiment of the present invention is implemented.

In the present invention, radio interface 108 between user equipment 102 and the E-UTRA and UTRAN 104 is improved for efficient realization of QoS. FIG. 2 illustrates the structure of radio interface 108 in which an embodiment of the present invention is implemented. As illustrated in FIG. 2, that the radio interface is organized into the physical layer (L1) 202, the radio link layer (L2) 204, and the radio network layer (L3) 206. FIG. 2 also illustrates IP Layer 207, which is outside of the radio interface structure. As the system is expected to take advantage of IP mobility and IP QoS features, there is a need to interwork between the components of IP Layer 207 and radio interface layer 108. Each layer provides services at Service Access Points (SAPs), wherein a service is a set of service operations that the layer provides to upper layers. Components of radio interface layer 108 are also connected by various interfaces. As shown in FIG. 2, a PHY SAP interface 220 exists between MAC 208 and PHY 203, an interface 226 exists between PDCP 210 and IP Layer 207, a MAC-control SAP interface 224 exists between MAC 208 and RRC 212, and a MAC-user SAP interface 222 exists between MAC 208 and PDCP 210.

Physical layer 202 includes a PHY component 203 which offers information transfer services to a MAC sublayer in radio link layer 204. Specifically, physical layer 202 transport services are transport channels that are described by how and with what characteristics data are transferred over radio interface 108. Specifically, physical layer 202 performs macrodiversity distribution/combining and soft handover execution, error detection on transport channels, and indications to higher layers, among other functions.

Radio link layer 204 is optimized for IP cellular access networks, taking advantage of IP mobility and IP QoS features for efficient radio access and transmission on shared transport channels. Specifically, radio link layer 204 includes Medium Access Control (MAC) 208 and Packet Data Convergence Protocol (PDCP) 210, wherein the functions and services of radio link layer 204 are distributed to MAC 208 and PDCP 210. Radio link layer 204 is divided into control and user planes, wherein the control plane includes MAC 208 and the user plane include MAC 208 and PDCP 210. In the user plane, PDCP 210 interfaces with MAC 208 directly and includes improved support for IP based QoS realization and implementation.

Radio network layer 206 includes a radio resource control (RRC) protocol 212 which belongs to the control plane. RRC 212 interfaces with radio link layer 204 and terminates with E-UTRA and UTRAN 104. Specifically, RRC 212 interfaces with PDCP 210, MAC 208 and physical layer 202. RRC 212 handles control plane signaling of layer 3 between user equipment 102 and E-UTRA and UTRAN 104. Some of the main functions of RRC 212 includes broadcast of core network system information and radio access network system information, connection management including establishment, re-establishment, maintenance and release between user equipment 102 and E-UTRA and UTRAN 104, configuration of radio link service profiles, allocation of layer 2 identifiers between user equipment 102 and E-UTRA and UTRAN 104, configuration of radio resources for RRC connection and traffic flows for common and shared resources, QoS management functions, RRC mobility functions, cell selection and reselection, handover functions, paging function, measurement reporting and control of measurement reporting, cell and link status reporting, protocol state indication, security functions and RRC message integrity protection.

Some of the main functions of MAC 208 include mapping between logical channels and transport channels, multiplexing/demultiplexing of upper layer packet data unit (PDU) of segmented MAC SDUs into and/or from transport blocks delivered to and/or from physical layer 202 on transport channels, traffic volume management, priority handling between data flows, priority handling between user equipments by means of dynamic scheduling, and service access class selection. Some of the main functions of PDCP 210 include, for IP compression purposes, IP stream detection on the user data for its SDU, header compression and decompression of given IP stream(s), transfer of user data via a given logical channel of radio link layer 204, support for low latency, and lossless handover in IP mobility.

In an embodiment of the present invention, a FLOW is defined as a IP flow detected by PDCP 210 from a set of IP packets and the FLOW is generated by multiplexing and/or de-multiplexing multiple IP flows. As such, an embodiment of the present invention relates to the detection and generation of suitable FLOW(s) at an IP convergence sublayer/PDCP 210 for efficient QoS realization in a network that includes E-UTRA and UTRAN. The generation of FLOW simplifies the MAC 208 (RLC) and RRC 212 structures including the packet data unit (PDU) structure, while supporting efficient QoS realization. Thus, the present invention realizes IP flow demultiplexing (QoS1) and IP flow multiplexing (QoS2) by the detection and generation of FLOW. Although the detection and generation function of PDCP 210 increases, the present invention does not require any additional control field.

Specifically, in an embodiment of the invention, PDCP 210 defines FLOW based on the IP header, wherein FLOW is not defined by only the source IP address, destination IP address, source port, destination port, Layer 4 protocol number and/or DSCP field. In the present invention, the definition of FLOW is more flexible. It should be noted that in an embodiment of the present invention if the QoS requirements are similar to the prior art, it is assumed that the QoS requirements for IP flows are known and those IP flows are classified into the same FLOW. This assumption enables an embodiment of the present invention to implement IP flow multiplexing/QoS2.

If, however, different QoS treatments are necessary for different packets from the same application, the present invention supports labeling by the application of the packets with different DSCP-equivalent information. PDCP 210 then identifies the DSCP-equivalent information and puts the packets into different FLOWS. This enables the present invention to implement IP flow demultiplexing/QoS1. In an embodiment of the present invention, if another identifier, other than the DSCP-equivalent information is available in the IP packets, the other identifier may also be used for FLOW classification.

In an embodiment of the invention, PDCP 210 requests the configuration of a corresponding logical channel based on the QoS requirement related to a specific FLOW. Then PDCP 210 puts all IP packets belonging to the same FLOW into the same corresponding logical channel. Thus, the present invention simplifies the MAC PDU structure while realizing QoS based flow multiplexing/demultiplexing without the addition of header fields.

In the present invention, because the IP flows with the same QoS requirements are multiplexed into one FLOW and mapped onto one logical channel, MAC 208 does not need to handle as many queuing buffers and waste the LCFID field, which is transmitted over the air. Furthermore, de-multiplexing of an IP flow into several QoS differentiated FLOW(s) allows for the present invention to efficiently share the available network resources among users while respecting the required QoS requirements of the IP flow. The de-multiplexing of an IP flow into several QoS differentiated FLOW(s) also does not require additional control fields in MAC 208 or PDCP 210. Because PDCP 210 can perform de-multiplexing of IP flows by using DSCP equivalent information, MAC 208 (RLC) structures are simplified.

Although in an embodiment of the invention the functionalities of PDCP 210 are extended, the extended functionalities of PDCP 210, to support QoS multiplexing/de-multiplexing, are preferred to a more complicated MAC 208 structure. The above-discussed configuration of the invention is, in a preferred embodiment, embodied on an IP based radio access network, with appropriate design to support E-UTRA and UTRAN. A person of skill in the art with respect to IP based radio access network would be able to implement the various embodiments of the present invention in other networks, based upon the architectural description discussed above. It would also be within the scope of the invention to implement the disclosed elements of the invention in other networks, thereby taking advantage of the functional aspects of the invention.

Figure 3:
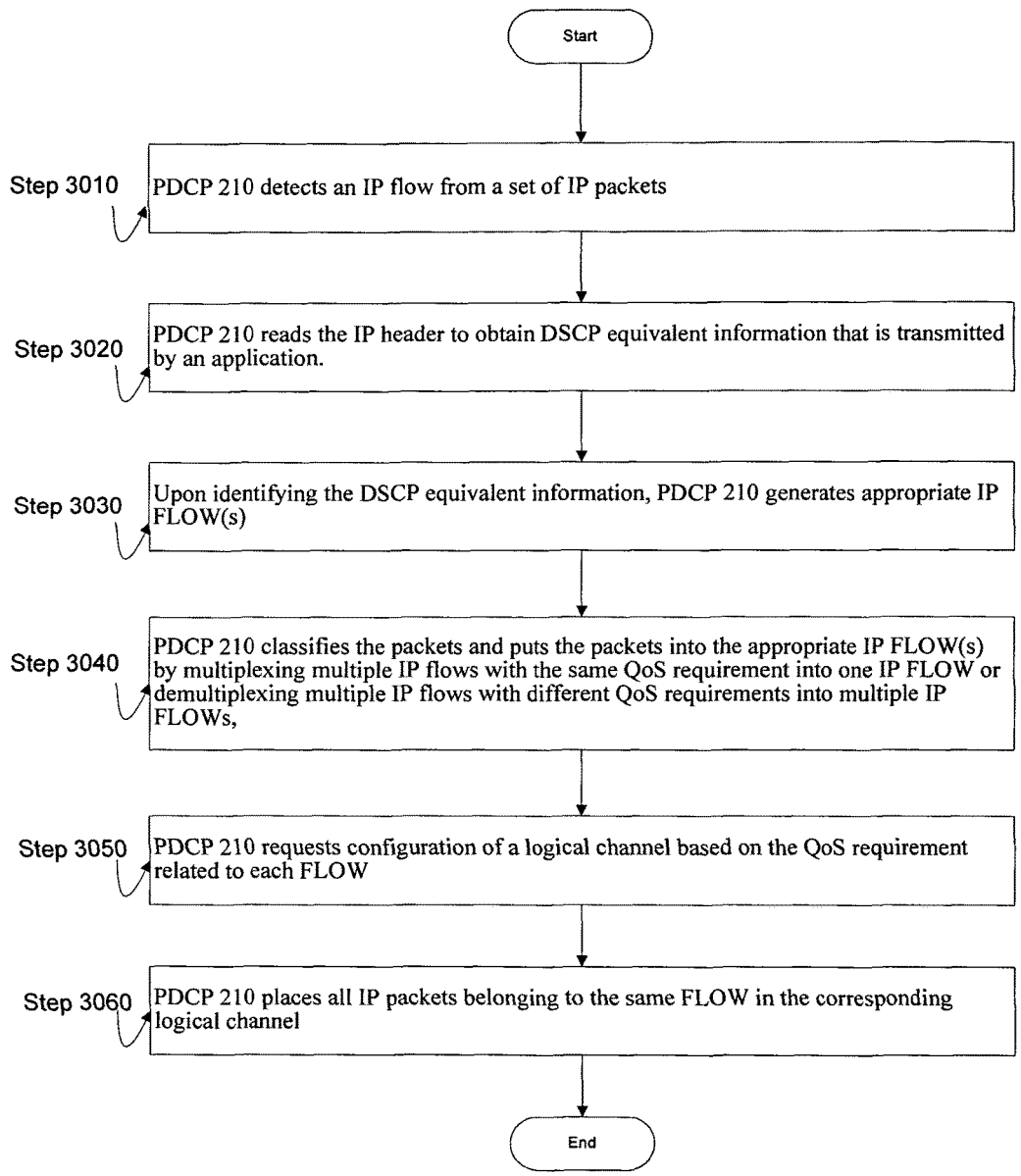
FIG. 3 illustrates the steps implemented in an embodiment of the present invention.

FIG. 3 illustrates the steps implemented in an embodiment of the invention. In Step 3010, PDCP 210 detects an IP flow from a set of IP packets. In Step 3020, PDCP 210 reads the IP header to obtain DSCP equivalent information that is transmitted by an application. In Step 3030, upon identifying the DSCP equivalent information, PDCP 210 generates appropriate IP FLOW(s). In Step 3040, PDCP 210 classifies the packets and puts the packets into the appropriate IP FLOW(s) by multiplexing multiple IP flows with the same QoS requirement into one IP FLOW or demultiplexing multiple IP flows with different QoS requirements into multiple IP FLOWs, wherein each FLOW includes packets with the same QoS requirements. In Step 3050, PDCP 210 requests configuration of a logical channel based on the QoS requirement related to each FLOW. In Step 3060, PDCP 210 places all IP packets belonging to the same FLOW in the corresponding logical channel. It should be noted that the term packet, as used in this description, is intended to broadly refer to any type of data gram including Ethernet packets, IP packets and cells.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed:

1. An apparatus comprising:
    a detector configured to detect at least one traffic flow from at least one packet;
    an obtainer, upon detection of the at least one traffic flow, configured to obtain predefined information from the at least one packet to determine a quality of service requirement that is associated with the at least one packet; and
    a creator configured to generate at least one other new traffic flow between one or more mobile user equipment and a gateway upon obtaining the predefined information, wherein a plurality of packets with the same quality of service requirement is multiplexed into the at least one other new traffic flow or the plurality of packets with different quality of service requirements is demultiplexed into other new traffic flows, each of the other new traffic flows having a different quality of service requirement and an associated destination address.

2. The apparatus of claim 1, wherein the detector is configured to detect predefined information defined as an equivalent priority information for a currently used priority field in a header associated with the at least one packet, wherein the equivalent priority information is supplied by an application transmitting the packet.

3. The apparatus of claim 1, wherein the detector is configured to detect predefined information defined in a priority information field in a header associated with the at least one packet supplied by an application transmitting the packet.

4. The apparatus of claim 1, wherein upon creating at least one other internet protocol flow, the creator is configured to request a logical channel based on the quality of service requirement related to the at least one other internet protocol flow.

5. The apparatus of claim 4, wherein the creator is configured to place all internet protocol packets belonging to the at least one other internet protocol flow in the logical channel.

6. The apparatus of claim 1, wherein the apparatus is configured to define the traffic flow as an internet protocol flow.

7. The apparatus of claim 1, wherein the apparatus is configured to define the packet as an internet protocol packet.

8. The apparatus of claim 1, wherein the detector, the obtainer, and the creator are comprised in a node in a radio link layer, the node interfacing a media access control function and at least one of an internet protocol layer or a radio resource controller.

9. The apparatus of claim 8, wherein the node comprises a packet data convergence protocol node.

10. A method comprising:
    detecting, by a network component, at least one traffic flow from at least one packet;
    upon detection of the at least one traffic flow, obtaining, by the network component, predefined information from the at least one packet to determine a quality of service requirement that is associated with the at least one packet; and
    generating, by the network component in communication with one or more mobile user equipment, at least one other new traffic flow upon obtaining the predefined information, wherein a plurality of packets with the same quality of service requirement is multiplexed into the other new traffic flow or the plurality of packets with different quality of service requirements is demultiplexed into other new traffic flows, each of the other new traffic flows having a different quality of service requirement and an associated destination address.

11. The method of claim 10, further comprising defining the predefined information as an equivalent priority information for a currently used priority field in a header associated with the at least one packet, wherein the equivalent priority information is supplied by an application transmitting the packet.

12. The method of claim 10, further comprising defining the predefined information as a priority information field in a header associated with the at least one packet supplied by an application transmitting the packet.

13. The method of claim 10, further comprising requesting a logical channel based on the quality of service requirement related to the at least one other traffic flow.

14. The method of claim 13, further comprising placing all packets belonging to the at least one other traffic flow in the logical channel.

15. A non-transitory computer readable medium including program code which when executed by at least one processor causes operations comprising:
    detecting at least one traffic flow from at least one packet;
    upon detection of at least one traffic flow, obtaining predefined information from the at least one packet to determine a quality of service requirement that is associated with the at least one packet; and
    generating at least one other new traffic flow between one or more mobile user equipment and a gateway upon obtaining the predefined information, wherein a plurality of packets with the same quality of service requirement is multiplexed into the other traffic flow or the plurality of packets with different quality of service requirements is demultiplexed into other new traffic flows, each of the other new traffic flows having a different quality of service requirement and an associated destination address.

16. An apparatus comprising:

at least one computer-based processor; and at least one memory including program code which when executed by the at least one computer-based processor configures the apparatus to causes at least:

detect at least one traffic flow from at least one packet;

obtain, upon the detection of the at least one traffic flow, configured to obtain predefined information from the at least one packet to determine a quality of service requirement that is associated with the at least one packet; and create at least one other new traffic flow between one or more mobile user equipment and a gateway upon obtaining the predefined information, wherein a plurality of packets with the same quality of service requirement is multiplexed into the at least one other new traffic flow or the plurality of packets with different quality of service requirements is demultiplexed into other new traffic flows, each of the other new traffic flows having a different quality of service requirement and an associated destination address.

* * * * *